(12) United States Patent
Lange et al.

(10) Patent No.: US 11,175,170 B2
(45) Date of Patent: Nov. 16, 2021

(54) ESTIMATING YIELD OF AGRICULTURAL CROPS

(71) Applicant: Trimble inc., Sunnyvale, CA (US)

(72) Inventors: Arthur Francis Lange, Sunnyvale, CA (US); Daniel Ramos, Los Banos, CA (US); Uriel Aparecido Rosa, Woodland, CA (US); Gregory C. Best, San Francisco, CA (US)

(73) Assignee: Trimble Inc., Sunnyvale, CA (US)

( * ) Notice: Subject to any disclaimer, the term of this patent is extended or adjusted under 35 U.S.C. 154(b) by 452 days.

(21) Appl. No.: 16/182,844

(22) Filed: Nov. 7, 2018

(65) Prior Publication Data
US 2020/0141784 A1 May 7, 2020

(51) Int. Cl.
*G01F 22/00* (2006.01)
*A01D 51/00* (2006.01)
(Continued)

(52) U.S. Cl.
CPC ............ *G01F 22/00* (2013.01); *A01D 51/00* (2013.01); *A01D 51/002* (2013.01); *A01D 57/30* (2013.01); *A01D 75/00* (2013.01); *G01B 11/25* (2013.01); *G01C 3/14* (2013.01); *G01S 13/89* (2013.01); *G01S 15/89* (2013.01); *G01S 17/89* (2013.01);
(Continued)

(58) Field of Classification Search
CPC ........ G01S 17/89; G01S 17/86; G01S 7/4865; G01S 17/88; G01S 13/867; G01S 15/89; G01S 19/13; G01S 19/42; G01S 19/52; G01C 21/165; G01C 3/14; G01F 22/00; A01D 41/127; A01D 41/1277; A01D 51/00; A01D 51/002; A01D 57/30; A01D 75/00; G01N 33/025; G01N 33/0098; G01N 2021/1797; G01B 11/25
See application file for complete search history.

(56) References Cited

U.S. PATENT DOCUMENTS 6,431,981 B1 * 8/2002 Shinners .............. A01D 43/085
460/6
2013/0124239 A1 5/2013 Rosa et al.
(Continued)

FOREIGN PATENT DOCUMENTS

WO 2014/052712 A2 4/2014

OTHER PUBLICATIONS

Extended European Search Report for Application No. 19207452.4-1004, dated Apr. 6, 2020, 9 pages.

*Primary Examiner* — Luke D Ratcliffe
(74) *Attorney, Agent, or Firm* — Kilpatrick Townsend & Stockton LLP

(57) ABSTRACT

Methods and systems for estimating volumes of agricultural crops are provided. A geographic position sensor provides positions of a harvesting machine as it gathers an agricultural crop and places the crop on the ground in a windrow. A speed of the harvesting machine is determined using the geographic position sensor. Signals are received from a sensor system disposed at a bottom of the harvesting machine. The signals are indicative of profiles of segments of the windrow on the ground. Cross-sectional areas of the windrow are estimated using the signals. Volumes of the agricultural crop are estimated using the speed of the harvesting machine and the estimated cross-sectional areas of the windrow.

22 Claims, 13 Drawing Sheets

(51) Int. Cl.
- *A01D 75/00* (2006.01)
- *G01C 3/14* (2006.01)
- *G01S 19/42* (2010.01)
- *G01S 19/52* (2010.01)
- *A01D 57/30* (2006.01)
- *G01B 11/25* (2006.01)
- *G01S 13/89* (2006.01)
- *G01S 15/89* (2006.01)
- *G01S 17/89* (2020.01)
- *G01S 19/13* (2010.01)

(52) U.S. Cl.
CPC ............... *G01S 19/13* (2013.01); *G01S 19/42* (2013.01); *G01S 19/52* (2013.01)

(56) References Cited

U.S. PATENT DOCUMENTS

| | | |
|---|---|---|
| 2017/0013772 A1 | 1/2017 | Kirk et al. |
| 2017/0176595 A1* | 6/2017 | McPeek .................. G01S 17/89 |
| 2018/0317388 A1* | 11/2018 | Gresch ................ A01B 79/005 |

* cited by examiner

ESTIMATING YIELD OF AGRICULTURAL CROPS

FIELD OF THE INVENTION

Embodiments described herein relate generally to estimating yield of agricultural crops, and more particularly, to estimating volume or yield of agricultural crops that are placed in a windrow as part of the harvest process.

BACKGROUND

Traditional techniques for harvesting some agricultural crops include cutting or gathering the crops and placing them in windrows for drying. Agricultural crops that are typically placed in windrows during harvesting include some nut crops like almonds and some broadacre crops like hay and alfalfa.

Conventional yield monitors that are used on combines while harvesting agricultural crops like corn and wheat do not work well with crops that are placed in windrows. Improved methods for estimating yield of agricultural crops that are placed in windrows are desired.

SUMMARY

Embodiments described herein provide improved methods and systems for estimating volume or yield of agricultural crops that are placed in windrows during harvesting. In an embodiment, for example, a sensor disposed on the bottom of a harvesting machine is used to estimate a profile of a relatively small portion of a windrow. The profile can be used to determine a cross-sectional area of the windrow which, along with a speed of the harvesting machine, can be used to estimate a volume of the agricultural crop. In some embodiments, the volume of the agricultural crop can be used with a density of the agricultural crop to determine a weight of the agricultural crop. The weight can be used with positions of the harvesting machine to generate georeferenced yield maps. The yield maps provide valuable information about the crop and are useful, for example, in managing the application of chemicals and irrigation water on the crop.

In accordance with an embodiment, a system for estimating volumes of an almhond crop includes an almond conditioner configured to separate almonds from detritus and to arrange the almonds on the ground in a windrow having a roughly uniform profile. The almond conditioner has an exit chute for arranging the almonds in the windrow and a stick box for collecting sticks of the detritus. The stick box is located at a rear of the almond conditioner and the exit chute is located forward of the stick box. A geographic position sensor is coupled to the almond conditioner and configured to provide positions of the almond conditioner as it places the almonds in the windrow. A sensor system is disposed on a bottom of the almond conditioner at a location between the exit chute and the stick box. The sensor system is arranged to receive signals indicative of profiles of segments of the windrow on the ground. Each segment of the windrow extends across a width of the windrow and along a length of the windrow. The length may be less than a distance between an end of the exit chute and a back end of the stick box. A controller is configured to receive the positions of the almond conditioner from the geographic position sensor, determine a speed of the almond conditioner using the geographic position sensor, receive signals from the sensor system, estimate cross-sectional areas of the windrow using the signals, and estimate volumes of the almonds using the speed of the almond conditioner and the estimated cross-sectional areas of the windrow. Each cross-sectional area may be associated with one of the segments of the windrow and represent a cross-section across the width of the windrow.

In some embodiments, the sensor system comprises a two-dimensional (2D) optical scanner configured to scan a laser beam across the width of the windrow and to receive reflected portions of the laser beam. In other embodiments, the sensor system comprises a three-dimensional (3D) time of flight (ToF) optical device configured to emit radiation toward each of the segments of the windrow and to receive reflected portions of the radiation. In other embodiments, the sensor system comprises multiple optical devices configured to obtain stereo images of each segment of the windrow. In other embodiments, the sensor system comprises a laser projector configured to emit a laser beam that forms an illuminated line across the width of the windrow and an optical device configured to obtain images of the illuminated line on the windrow. In yet other embodiments, the sensor system comprises ultrasonic sensors configured to use sound waves to determine distances to the ground and to the windrow.

In an embodiment, the controller is further configured to estimate yield of the almond crop based on the volumes of the almonds and generate a yield map using the positions of the almond conditioner and the yield of the almond crop.

In another embodiment, the sensor system includes an emitter that is arranged to emit radiation in a direction that is approximately normal to the windrow.

In accordance with another embodiment, a system for estimating volumes of agricultural crops gathered in windrows includes a harvesting machine configured to gather an agricultural crop and arrange the agricultural crop on the ground in a windrow. A geographic position sensor is coupled to the harvesting machine and configured to provide positions of the harvesting machine as it places the agricultural crop on the ground in the windrow. A sensor system is disposed at a bottom of the harvesting machine and arranged to receive signals indicative of profiles of segments of the windrow on the ground. Each segment of the windrow extends across a width of the windrow and along a length of the windrow. The length may be less than about 10 feet of the windrow. A controller is coupled to the geographic position sensor and to the sensor system. The controller is configured to receive the positions of the harvesting machine from the geographic position sensor, determine a speed of the harvesting machine using the geographic position sensor, receive signals from the sensor system; estimate cross-sectional areas of the windrow using the signals, and estimate volumes of the agricultural crop using the speed of the harvesting machine and the estimated cross-sectional areas of the windrow. Each cross-sectional area may be associated with one of the segments of the windrow and represent a cross-section across the width of the windrow.

In accordance with yet another embodiment, a method for estimating volumes of agricultural crops gathered in windrows includes receiving positions from a geographic position sensor coupled to a harvesting machine, determining a speed of the harvesting machine using the geographic position sensor, receiving signals from a sensor system disposed at a bottom of the harvesting machine, estimating cross-sectional areas of the windrow using the signals, and estimating volumes of the agricultural crop using the speed of the harvesting machine and the estimated cross-sectional areas of the windrow. The signals are indicative of profiles of segments of the windrow on the ground. Each segment of the windrow extends across a width of the windrow and along a length of the windrow. The length may be less than about 10 feet of the windrow. Each cross-sectional area is associated with one of the segments of the windrow and represents a cross-section across the width of the windrow.

In an embodiment, the method also includes estimating a yield of the agricultural crop based on the volumes, and generating a yield map using the positions of the harvesting machine and the yield of the agricultural crop.

In another embodiment, the signals are generated using an optical sensor system that emits radiation toward each of the segments of the windrow and receives reflected portions of the radiation.

In yet another embodiment, the signals are generated using an ultrasonic sensor system that emits sound waves toward each segment of the windrow and receives reflected portions of the sound waves.

Numerous benefits are achieved using embodiments described herein over conventional techniques. Some embodiments, for example, allow the volume of an agricultural crop to be estimated while the crop is cut and/or gathered and placed in a windrow. This provides improved accuracy and quicker time to data compared to conventional techniques that measure a weight and/or volume of a crop after harvesting. Also, in some embodiments, the estimated volume of the crop can be georeferenced so that it can be used to generate a yield map. Yield maps are useful in managing the application of chemicals and irrigation water on the crop. Depending on the embodiment, one or more of these features and/or benefits may exist. These and other benefits are described throughout the specification with reference to the appended drawings.

DETAILED DESCRIPTION

Embodiments described herein provide methods and systems for estimating yield of agricultural crops that are placed in windrows during harvesting. A windrow is a linear pile of an agricultural crop that has been cut and/or gathered and is arranged in a row. Agricultural crops are typically arranged in windrows to allow the crop to dry before continuing the harvesting process. Agricultural crops that are typically placed in windrows include, for example, some nut crops like almonds and some broadacre crops like hay and alfalfa. FIGS. 1A-1B, 2, and 3 provide non-limiting examples of harvesting machines that may benefit from the embodiments described herein. Each of these harvesting machines may be, for example, a tractor that is driven by an operator, or a farm implement that is pulled by a tractor or another farm machine.

Figure 1A:
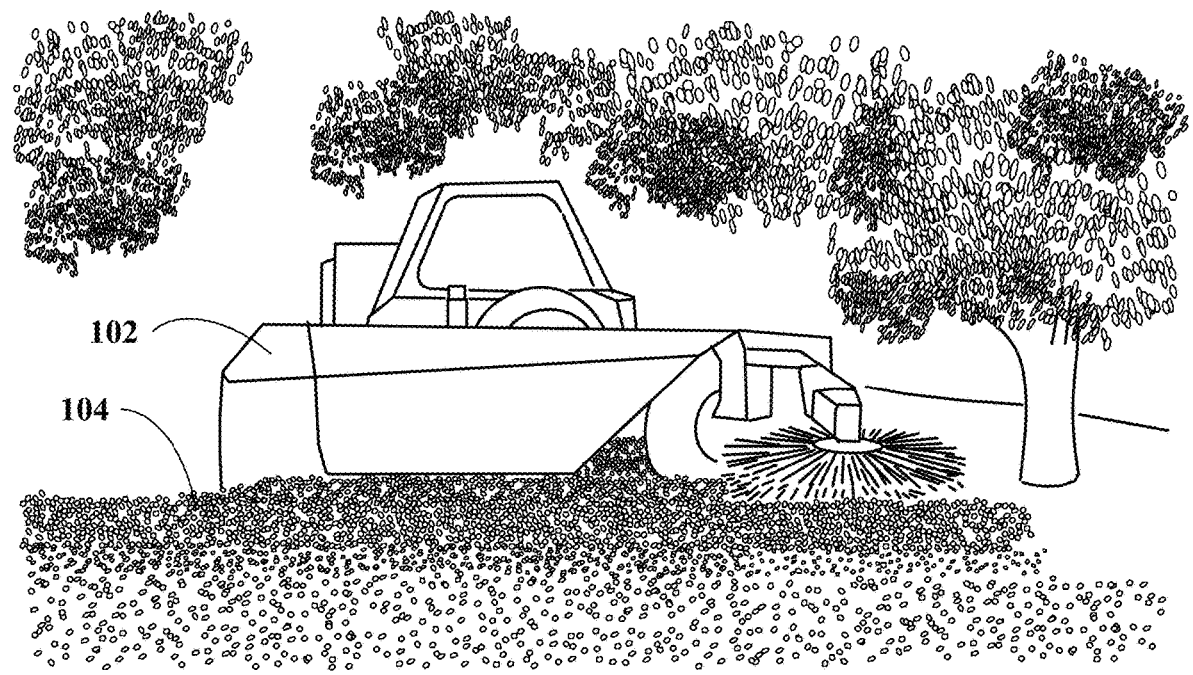
FIGS. 1A-1B and 2-3 are simplified drawings of harvesting machines cutting and/or gathering agricultural crops and placing them in a windrow.
Figure 1B:
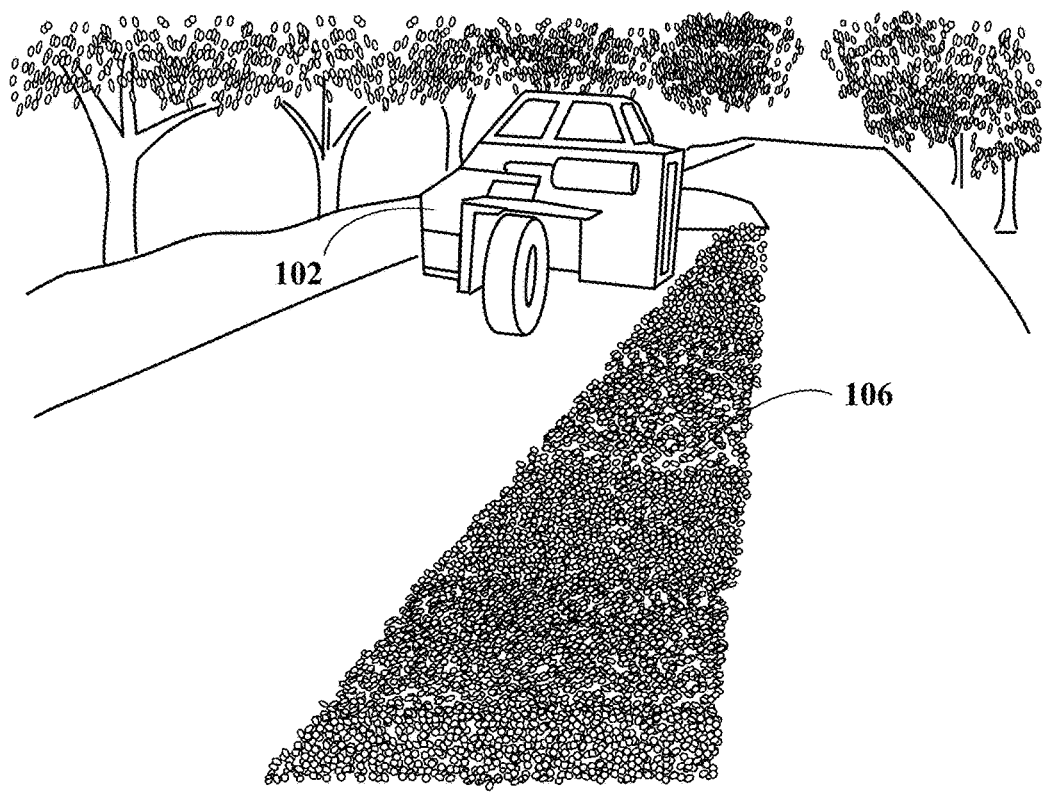

FIGS. 1A-1B are simplified drawings of a nut sweeper gathering nuts and placing them in a windrow. FIG. 1A is a front-view of the nut sweeper 102 as it sweeps and gathers the nuts 104. Prior to the situation illustrated in this figure, a tree shaker has been used to shake the trees, leaving the nuts 104 spread across the ground. The nut sweeper 102 gathers the nuts 104 and places them in a linear pile (or windrow). The nut sweeper 102 may be, for example, a tractor that is driven by an operator and that uses implements such as brushes and blowers to gather the nuts 104. The nuts 104 at this point in the harvesting process may include a significant volume of detritus (e.g., dirt, stones, leaves, sticks, etc.).

FIG. 1B is a rear-view of the nut sweeper 102 showing the nuts and detritus arranged in the windrow 106. The windrow 106 is usually about 0.6 meters wide and ranges from about 5 to 20 centimeters in height, but the windrow 106 can be more or less spread out depending on such factors as the configuration of the nut sweeper 102, the distance between the trees, the yield of crop, and the like. A cross-section across the width of the windrow 106 can be irregular in shape but generally peaks near the middle and thins towards the edges.

Figure 2:
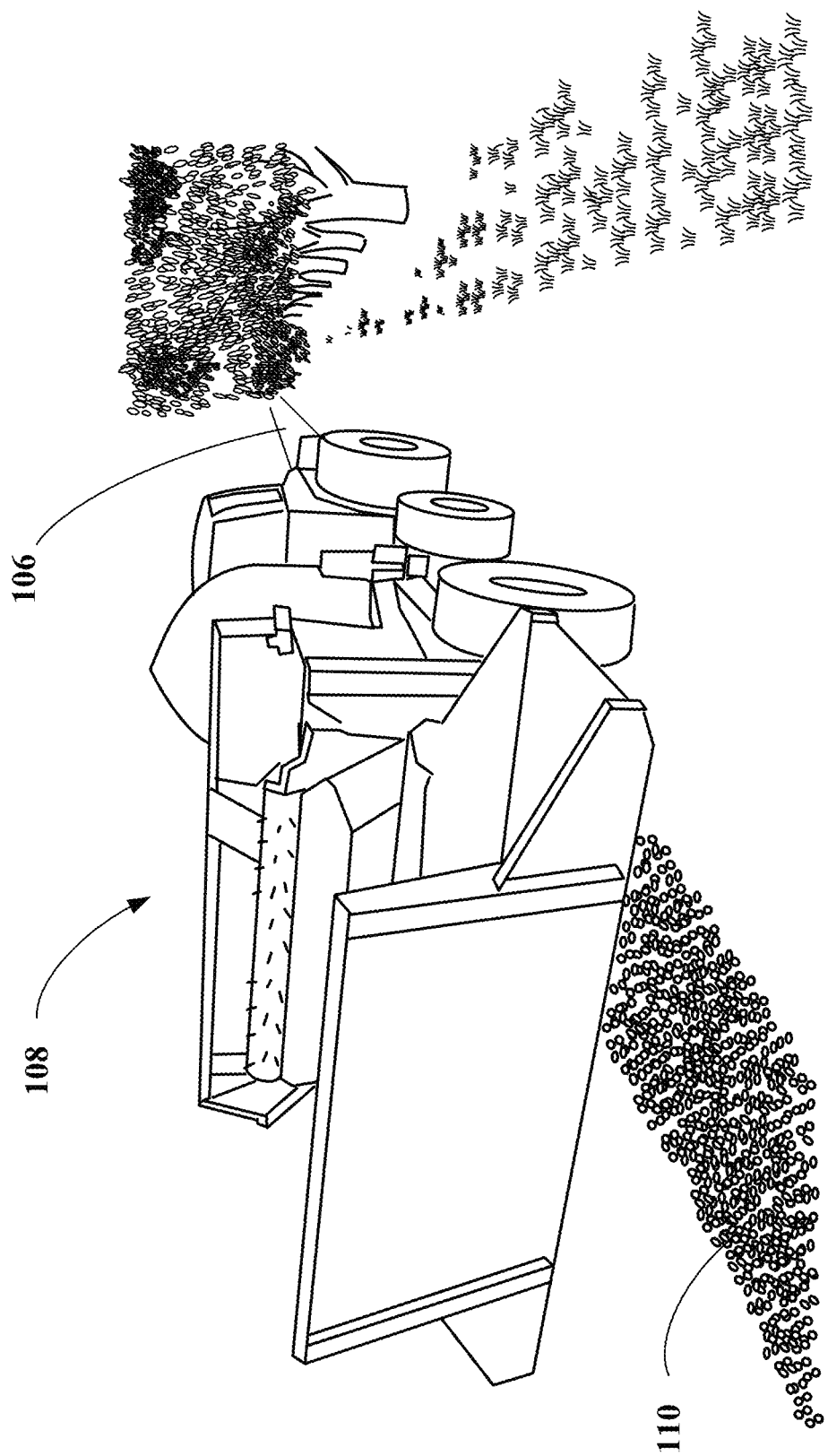

In some situations, it may be advantageous to separate the nuts from the detritus and arrange the nuts in more uniform windrows for drying. An example of this is shown in FIG. 2, where a conditioner 108 gathers the nuts and detritus that have been placed in the windrow 106 by the nut sweeper. In an embodiment, the conditioner 108 is an almond conditioner that separates almonds, that have been shaken from the trees and gathered in windrows using a sweeper, from the detritus. The conditioner 108 passes the nuts and detritus over a series of belts and screens to separated out the dirt, stones, leaves, and sticks. The nuts are then placed back on the ground in a more uniform windrow 110. The nuts in a conditioner produced windrow 110 usually dry more uniformly than nuts in a sweeper produced windrow 106. The conditioner 108 may use a scraper blade (e.g., a v-blade) to level the ground where the windrow 110 is placed. This can improve windrow profile estimates using the embodiments described below. The nuts are generally dried in the windrow 110 for a few days before being gathered and transported for further processing.

Figure 3:
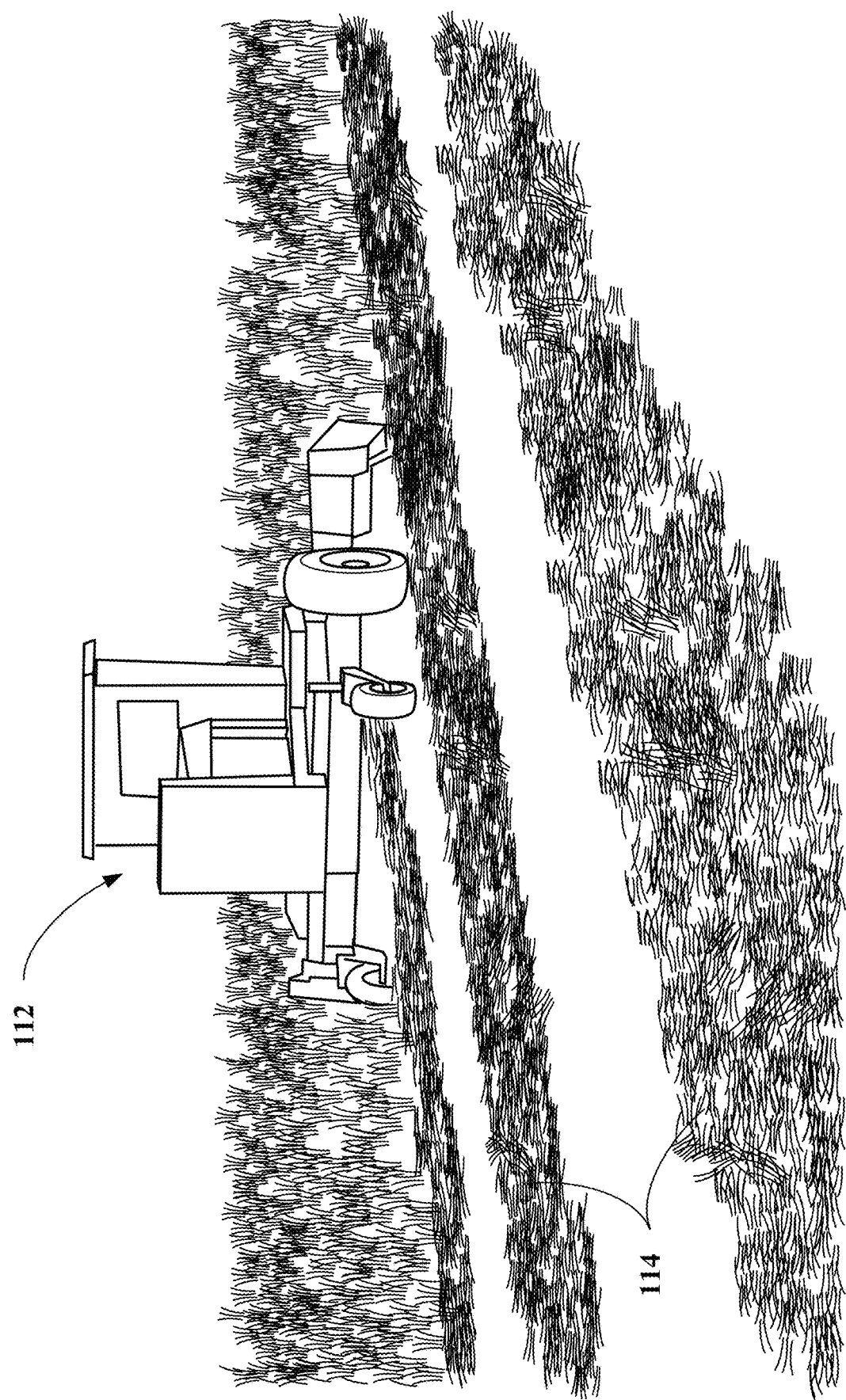

FIG. 3 is a simplified drawing of a swather cutting and placing hay, alfalfa, grain, or another crop in a windrow. This figure is a side, rear-view of the swather 112 as it cuts the crop and places the crop in the windrow 114. The crop in the windrow 114 may be gathered by another harvesting machine or it may be allowed to dry before further processing.

The nut sweeper, conditioner, and swather are used herein as examples of harvesting machines. Each of these machines is configured to gather an agricultural crop and arrange the agricultural crop in a windrow. There are many other types of farm equipment that are also harvesting machines and that can be used with the embodiments described herein.

All types of harvesting machines benefit from being able to quantify an amount of an agricultural crop that has been gathered or harvested. Embodiments described herein provide methods and systems for estimating a volume of an agricultural crop that is placed in a windrow. In an embodiment, for example, a sensor disposed on the bottom of a harvesting machine is used to estimate a profile of a relatively small portion (or segment) of a windrow. The profile, along with a speed of the harvesting machine, can be used to estimate the volume of the agricultural crop. In some embodiments, the volume of the agricultural crop can be used to estimate yield, and the positions of the harvesting machine can be used with the yield to generate yield maps.

In some embodiments, the harvesting machine may be any tractor or implement that includes a sensor system as described herein. The tractor or implement may be driven or pulled over windrows and the sensor system may be used to estimate profiles, cross-sections, and/or volumes of the windrows. The harvesting machine may or may not be the machine that placed the agricultural crop in the windrows.

Figure 4A:
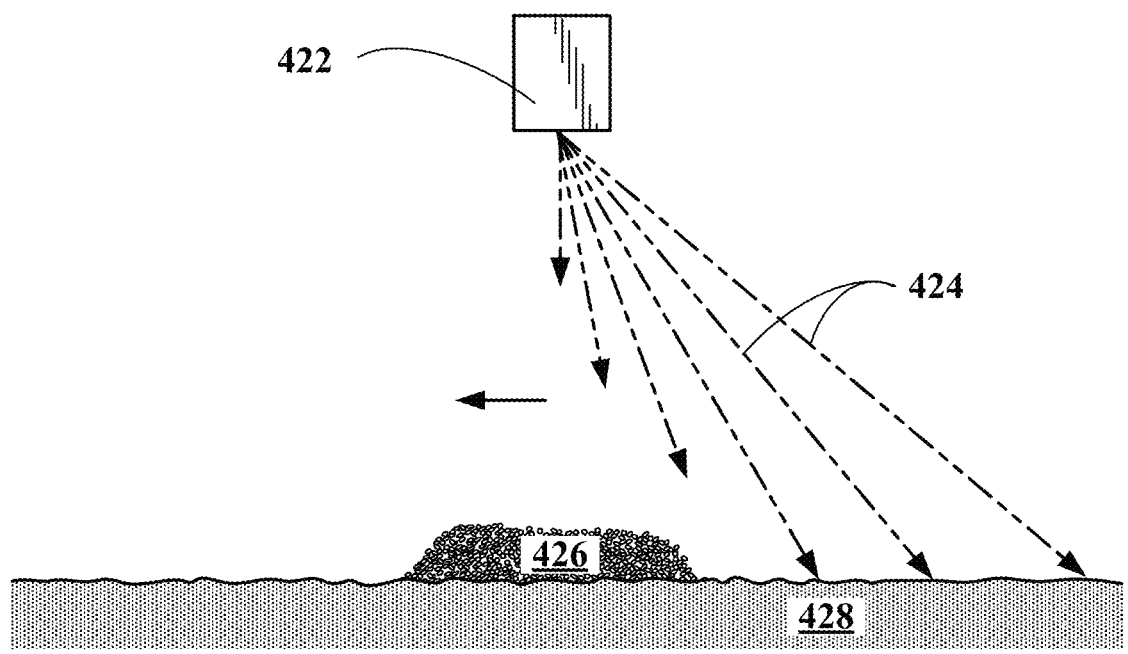
FIGS. 4A-4B are simplified drawings of an optical sensor system that can be used for determining a profile of a windrow in accordance with an embodiment.
Figure 4B:
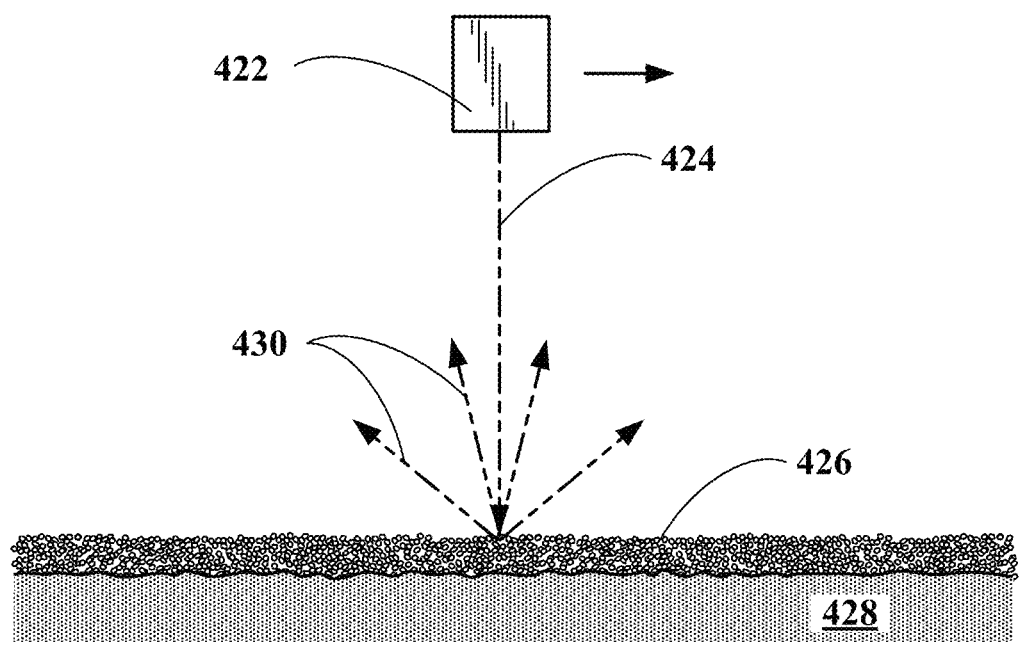

FIGS. 4A-4B are simplified drawings of an optical sensor system that can be used for determining a profile of a windrow in accordance with an embodiment. It should be appreciated that in the examples provided herein, the windrows are not limited to a particular crop or to being arranged by a particular harvesting machine. FIG. 4A is a front or back-view looking at a cross-section across a width of a windrow 426, and FIG. 4B is a side-view looking at a cross-section along a length of the windrow 426.

The optical sensor system comprises a two-dimensional (2D) optical scanner 422 configured to scan a laser beam 424 across the width of the windrow 426. A three-dimensional (3D) optical scanner may be used in some embodiments in a manner similar to the 2D optical scanner 422. FIG. 4A is intended to illustrate the laser beam 424 scanning from right to left across the width of the windrow 426. In this figure, some of the arrows associated with the laser beam 424 extend all the way to the ground 428, while others extend only part way to the ground 428 or to the windrow 426. This is intended to be illustrative of the side-to-side (or back and forth) scanning of the laser beam 424 across the width of the windrow 426. In this example, the scan starts on the ground 428 on the right side of the windrow 426 and continues across the entire width of the windrow 426 to the ground 428 on the left side of the windrow 426. FIG. 4B shows that the 2D optical scanner 422 in this example uses a relative narrow laser beam 424.

As shown in FIG. 4B, the reflected portions 430 of the laser beam are scattered in many directions. At least some of the reflected portions 430 are received by a detector (not shown) of the optical sensor system. The detector may be part of the 2D optical scanner 422 or it may be arranged separately. The optical sensor system is configured to determine distances to the ground 428 and to the windrow 426 using known scanning techniques (e.g., time of flight (ToF) or LIDAR). A profile of the windrow 426 can be estimated by assuming the ground 428 is substantially flat or planar. The profile of the windrow 426 is the portion of the profile obtained by the 2D optical scanner 422 that extends above the ground plane. Data smoothing techniques may be used to reduce variation due to the irregular surface of the windrow 426.

Although not shown in these figures, the optical sensor system may be coupled to a harvesting machine that moves in the direction indicated by the arrow in FIG. 4B. In some embodiments, the optical sensor system may be coupled either directly or indirectly to a bottom of the harvesting machine. The 2D optical scanner 422 may be arranged so that the laser beam 424 is emitted in a direction that is substantially normal to the windrow 426 at least along a portion of the side-to-side scan.

Although the length of the windrow 426 appears to be continuous in FIG. 4B, it should be appreciated that the windrow 426 is placed on the ground by the harvesting machine as the agricultural crop is cut or gathered. As will be explained with regard to FIGS. 5-7, the optical sensor system may be coupled to the harvesting machine and configured to estimate a profile of the windrow 426 as the agricultural crop is being harvested.

Using the profile of the windrow 426, a cross-sectional area of the windrow 426 can be determined. Profiles and cross-sectional areas of the windrow 426 may be determined at a particular frequency and, based on a speed of the harvesting machine, a volume of a segment of the windrow 426 can be determined. The profile, cross-sectional area, and/or volume may be determined by the optical sensor system or may be determined by a controller that is separate from the optical sensor system and that uses signals received from the optical sensor system.

The segment includes a length of the windrow 426 that is typically less than about 10 feet. The length is limited because the optical sensor system is arranged on the harvesting machine in a downward facing orientation so the windrow 426 is within a field of view. The optical sensor system is also typically arranged in a relative close proximity to the windrow 426. As used herein, the field of view refers to an area of irradiation by an emitter of the optical sensor system.

Using the 2D optical scanner 422, the segment may be a portion of the windrow 426 that is bound on each end by estimated profiles. Alternatively, each estimated profile may be associated with a portion of the windrow. Other methods of using the profiles to determine the volume of the windrow 426 are anticipated, and the embodiments described herein are not limited to a particular method.

In some embodiments, geographic position sensor (e.g., a global navigation satellite system (GNSS) receiver) may be used to determine positions and speed of the harvesting machine. The speed of the harvesting machine can be used to determine distance traveled (or length of the windrow). The volume of the crop may be determined using any of a number of different techniques, and the particular technique may be based on the type of crop, the conditions of the crop, or other factors. For example, in some embodiments, the volume may be based on an average cross-sectional areas of adjacent profiles bounding a particular length (or segment) of the windrow. Known data smoothing techniques may be used in some embodiments.

Figure 5:
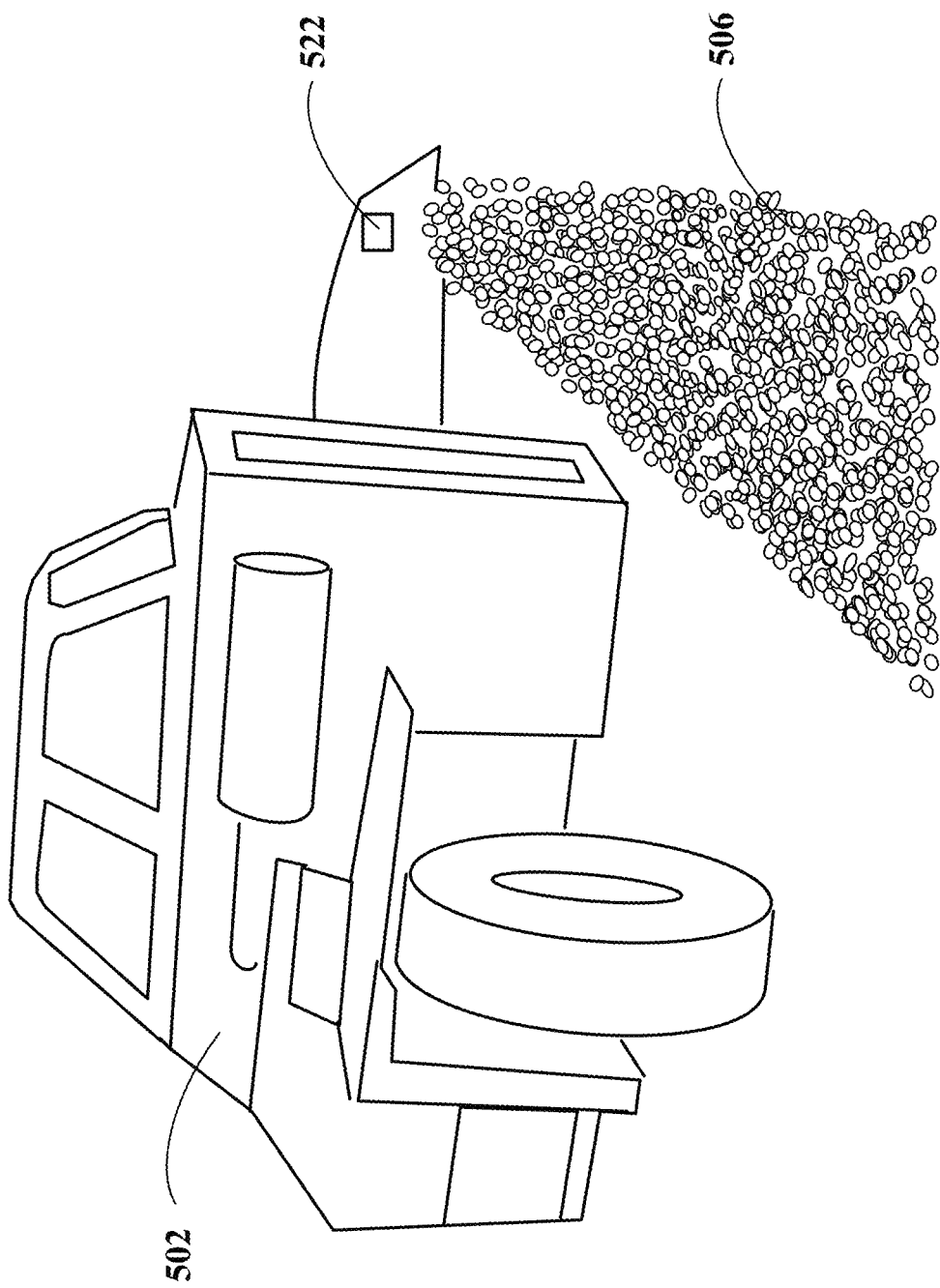
FIGS. 5-7 are simplified drawings of harvesting machines that include sensor systems for determining profiles of windrows in accordance with some embodiments.
Figure 6:
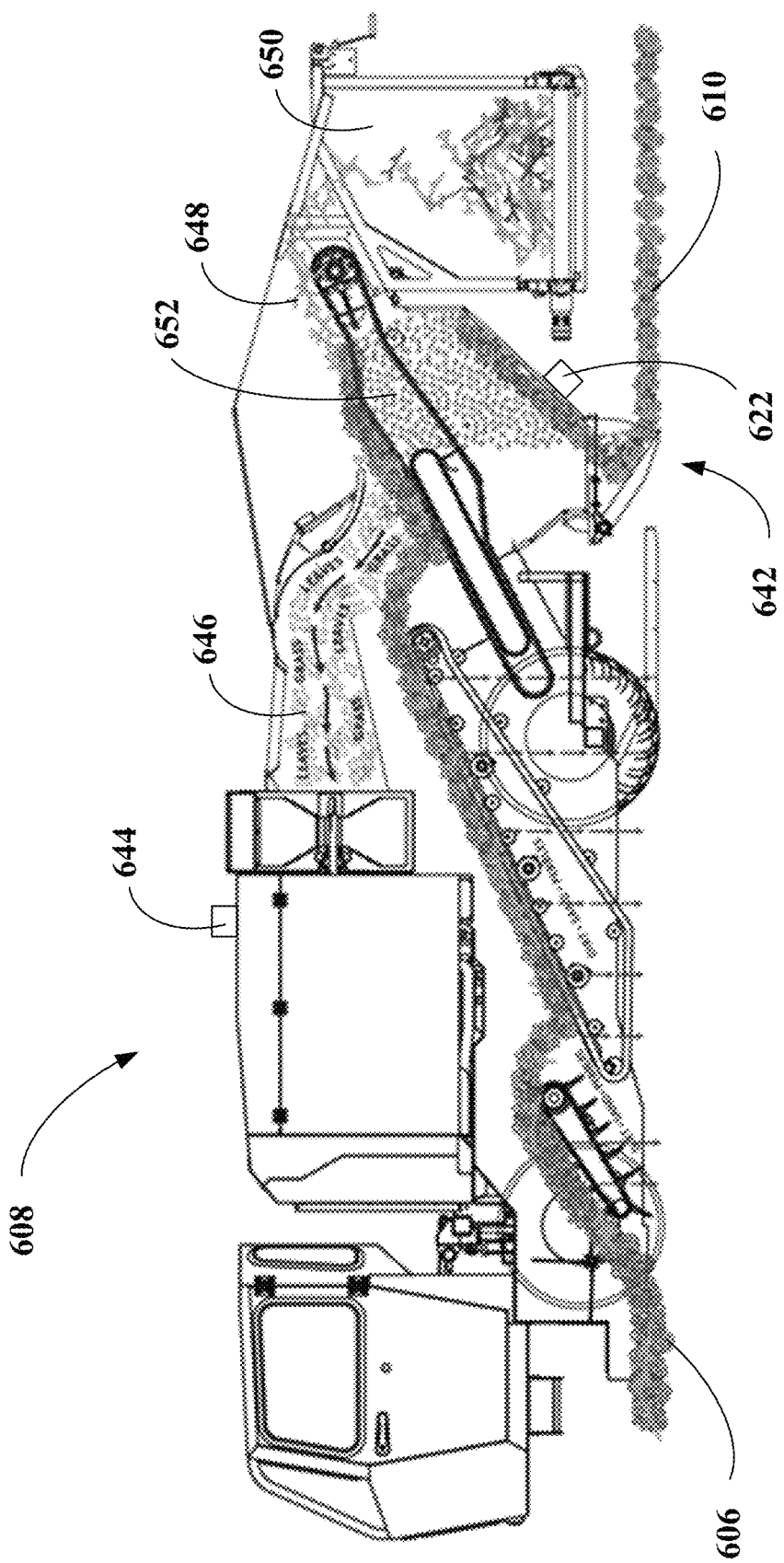
Figure 7:
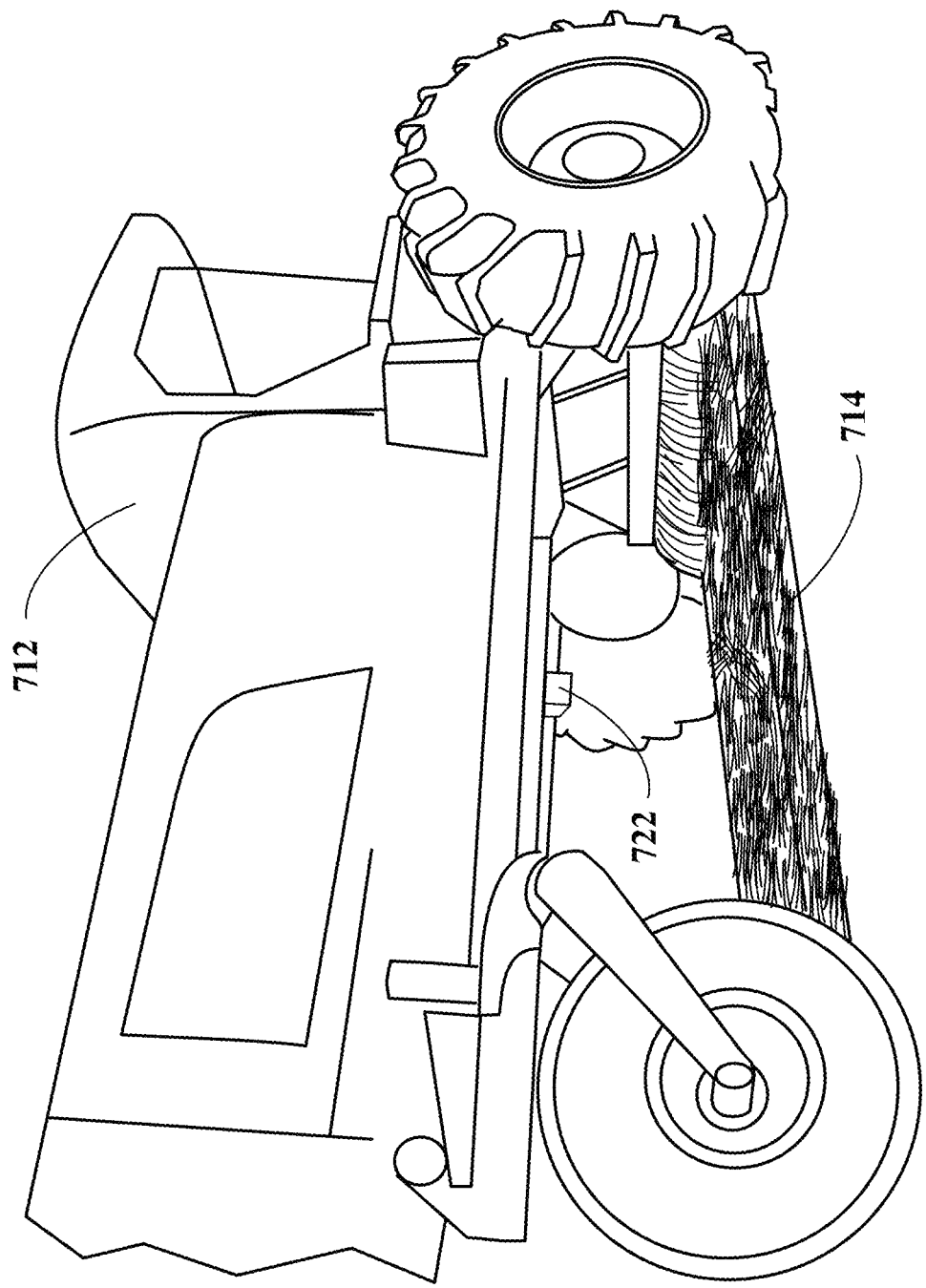

FIGS. 5-7 are simplified drawings of harvesting machines that include sensor systems for determining a profile of a windrow in accordance with some embodiments. FIG. 5 is a simplified drawing of a nut sweeper 502 that is gathering nuts and placing them in a windrow 506. This figure provides a rear-view of the nut sweeper 502 and the nuts arranged in the windrow 506. A sensor system 522 is coupled to the nut sweeper 502 at a position that is near an exit of the nuts from the nut sweeper 502. The sensor system 522 is arranged in a substantially downward facing orientation so that the windrow 506 is within a field of view. The sensor system 522 may include, for example, an emitter configured to emit radiation (e.g., electromagnetic radiation) toward the windrow 506 and a detector configured to receive reflected portions of the radiation. Other possible configurations of the sensor system 522 are described in FIGS. 8A-8B, 9A-9B, 10A-10B, and 11A-11B. A profile of the windrow 506 can be determined using the embodiments described herein.

A geographic position sensor (not shown) is coupled to or integrated with the nut sweeper 502. The geographic position sensor is configured in accordance with known positioning techniques to provide positions and speed of the nut sweeper 502 as it places the nuts in the windrow 506.

FIG. 6 is a simplified drawing of an almond conditioner 608 that is separating almonds from detritus and arranging the almonds on the ground in a windrow 610. The conditioner produced windrow 610 is cleaner and typically more uniform in shape than a sweeper produced windrow 606. This figure provides a side-view of the almond conditioner 608 and shows the almonds 652 being separated from detritus that includes leaves 646 and sticks 648. The sticks are collected in a stick box 650 that is generally located at a rear of the almond conditioner 608. The almonds 652 are arranged in the windrow 610 as they pass through an exit chute 642.

A sensor system 622 is coupled to the almond conditioner 608 at a location that is between the exit chute 642 and the stick box 650. The sensor system 622 may be arranged at a height that is at least about one foot above the ground (or above the windrow 610). The sensor system 622 is arranged in a substantially downward facing orientation so that the windrow 610 is within a field of view. The sensor system 622 may include, for example, an emitter configured to emit radiation toward the windrow 610 and an detector configured to receive reflected portions of the radiation. Other sensor systems may be used in other embodiments. A profile of the windrow 610 can be determined using the embodiments described herein.

A geographic position sensor 644 is coupled to or integrated with the almond conditioner 608. The geographic position sensor is configured in accordance with known positioning techniques to provide positions and speed of the almond conditioner 608 as it places the almonds 652 in the windrow 610.

FIG. 7 is a simplified drawing of a swather 702 that is cutting and placing hay, alfalfa, grain, or another agricultural crop in a windrow 714. This figure provides a side-view of the swather 702 and the agricultural crop arranged in the windrow 714. A sensor system 722 is coupled to the swather 702 at a position that is near an exit of the agricultural crop from the swather 702. The sensor system 722 may be arranged at a height that is about three to four feet above the ground (or above the windrow 714). The sensor system 722 is arranged in a substantially downward facing orientation so that the windrow 714 is within a field of view. The sensor system 722 may include, for example, an emitter configured to emit radiation toward the windrow 714 and an detector configured to receive reflected portions of the radiation. Other sensor systems may be used in other embodiments. A profile of the windrow 714 can be determined using the embodiments described herein.

A geographic position sensor (not shown) is coupled to or integrated with the swather 702. The geographic position sensor is configured in accordance with known positioning techniques to provide positions and speed of the swather 702 as it places the agricultural crop in the windrow 714.

The sensor systems 522, 622, 722 shown in these examples may include a housing that reduces ambient light and/or provides protection from dust. In some embodiments, clean air may flow across a lens or through the housing to reduce dust buildup on components of the sensor systems 522, 622, and 722.

The embodiments described herein can be implemented with any of a number of different type of sensor systems. FIGS. 4A-4B provide an example where the sensor system includes an optical scanner. FIGS. 8A-8B, 9A-9B, and 10A-10B provide additional examples. FIGS. 11A-11B provide an example where the sensor system includes ultrasonic sensors. These examples illustrate some different types of sensor systems, but these examples are not intended to be exhaustive or limiting. Any sensor system that can estimate a profile of a windrow on the ground can be used with the embodiments described herein.

Figure 8A:
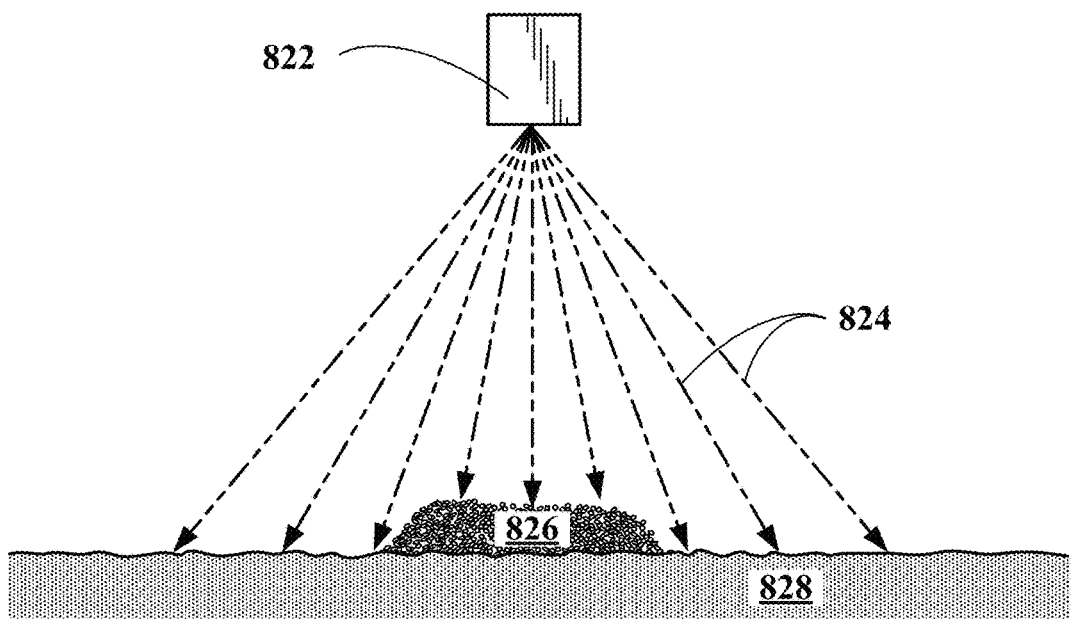
FIGS. 8A-8B, 9A-9B, and 10A-10B are simplified drawings of optical sensor systems that can be used for determining profiles of windrows in accordance with some embodiments.
Figure 8B:
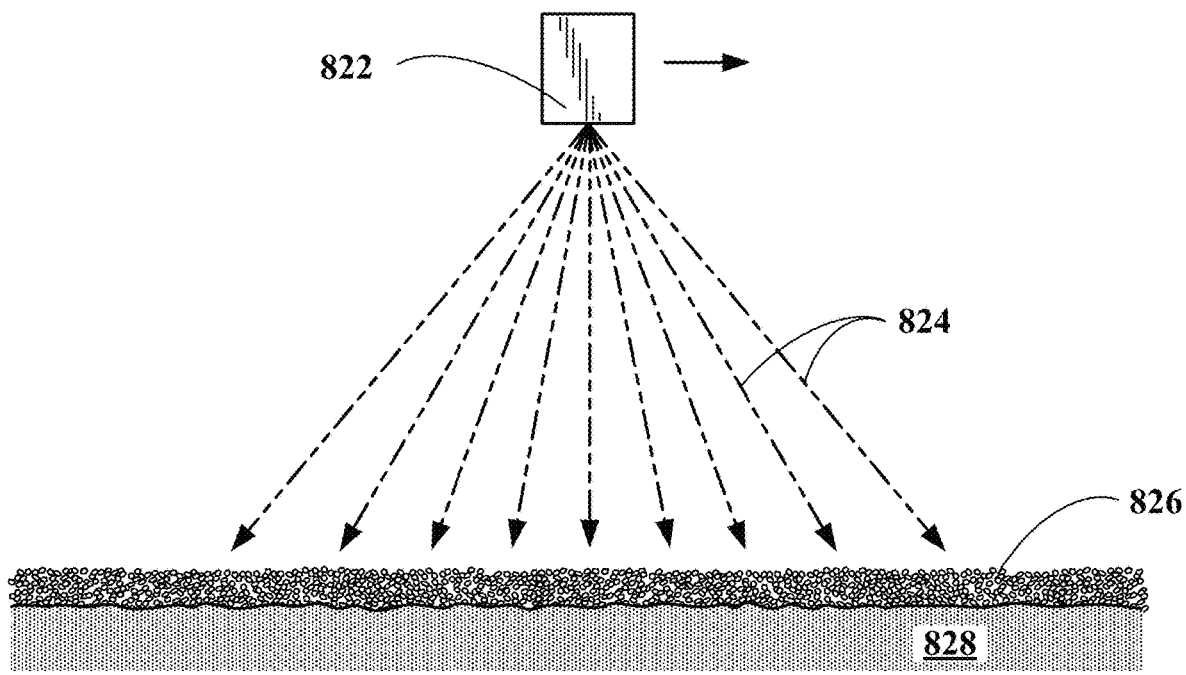

FIGS. 8A-8B are simplified drawings of an optical sensor system that can be used for determining a profile of a windrow in accordance with another embodiment. FIG. 8A is a front or back-view looking at a cross-section across a width of a windrow 826, and FIG. 8B is a side-view looking at a cross-section along a length of the windrow 826.

The optical sensor system in this example may comprise a three-dimensional (3D) optical scanner 822 configured to scan a laser beam (or beams) 824 across the width of the windrow 826 as shown in FIG. 8A and along a length of the windrow 826 as shown in FIG. 8B. The scanning of each segment is not limited to any particular scan pattern.

Although not specifically shown in these figures, the reflected portions of the laser beam 824 are scattered in many directions. At least some of the reflected portions are received by a detector (not shown) of the optical sensor system. The detector may be part of the 3D optical scanner 822 or it may be arranged separately. The optical sensor system is able to determine distances to the ground 828 and to the windrow 826 using known scanning techniques (e.g., time of flight or LIDAR). A profile of the windrow 826 can be estimated by assuming the ground 828 is substantially flat or planar. The profile of the windrow 826 is the portion of the profile obtained by the 3D optical scanner 822 that extends above the ground plane. Data smoothing techniques may be used to reduce variation due to the irregular surface of the windrow 826.

Although not shown in these figures, the optical sensor system may be coupled to a harvesting machine that moves in the direction indicated by the arrow in FIG. 8B. The 3D optical scanner 822 may be arranged so that the laser beam 824 is emitted in a direction that is substantially normal to the windrow 826 during at least part of the scan.

Using the 3D scanner 822 shown in this example, the profile of a segment of the windrow 826 can be estimated. The segment includes the area of the windrow 826 that is irradiated by the 3D optical scanner 822. The segment includes a length of the windrow 426 that is typically less than about 10 feet. Using the estimated 3D profile, an average estimated profile, a smoothed estimated profile, or the like can be used to determine a cross-sectional area of the segment (or cross-sectional areas at different points of the segment). The cross-sectional areas can be used to determine a volume of the crop in each segment. The profile, cross-sectional area, and/or volume may be determined by the optical sensor system or may be determined by a controller that is separate from the optical sensor system and that uses signals received from the optical sensor system. Known data smoothing techniques may be used in some embodiments.

In some embodiments, a GNSS may be used to determine positions and speed of the harvesting machine associated with each segment of the windrow.

In alternative embodiments, the optical sensor system shown in FIGS. 8A-8B may comprise one or more 3D time of flight (ToF) optical device(s) 822 configured to emit radiation 824 toward an area that includes at least a portion of the windrow 826. The number of 3D ToF optical device(s) 822 may depend on the field of view of each device and a width of the windrow 826. A single 3D ToF optical device 822 may be used if the field of view covers a width of the windrow 826 including portions of the ground 828 on each side. Multiple 3D ToF optical devices 822 may be used if necessary to form a collective field of view that covers the width of the windrow 826 including portions of the ground 828 on each side. Although not specifically shown in these figures, the reflected portions of the radiation 824 are scattered in many directions. At least some of the reflected portions are received by a detector or detectors (not shown) of the optical sensor system. The detector(s) may be part of the 3D ToF optical device(s) 822 or they may be arranged separately. In an embodiment, the radiation 824 may be generated by LED or laser sources, and the reflected portions of the radiation 824 may be received by an array of photodetectors each arranged to receive portions of the radiation 824 reflected from a particular area of the field of view. The optical sensor system is able to determine distances to the ground 828 and to the windrow 826 using known techniques (e.g., time of flight or LIDAR). A profile of the windrow 826 can be estimated by assuming the ground 828 is substantially flat or planar. The profile of the windrow 826 is the portion of the profile obtained by the 3D ToF optical device(s) 822 that extends above the ground plane. The 3D ToF optical device(s) 822 are otherwise similar to the 3D optical scanner 822 described previously.

Figure 9A:
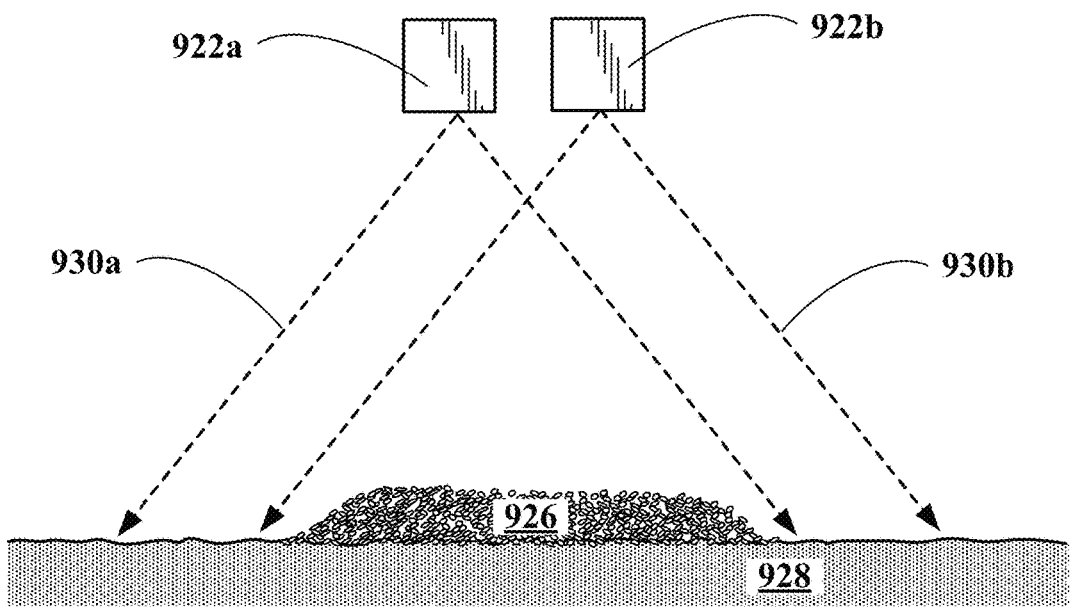
Figure 9B:
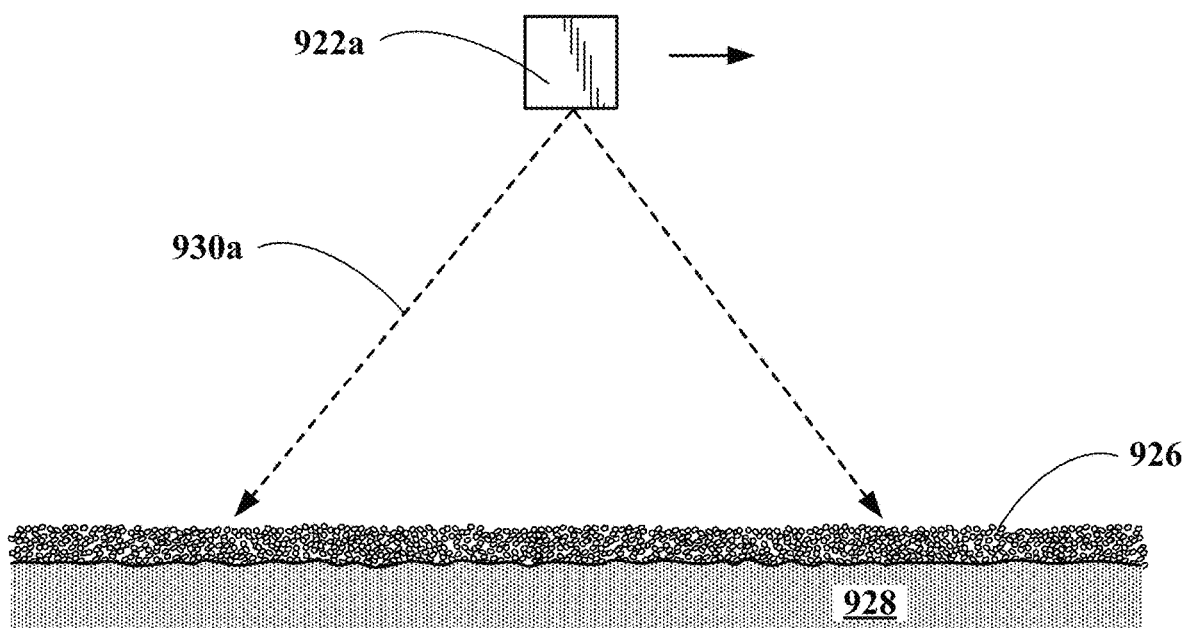

FIG. 9A-9B are simplified drawings of an optical sensor system that can be used for determining a profile of a windrow in accordance with another embodiment. FIG. 9A is a front or back-view looking at a cross-section across a width of a windrow 926, and FIG. 9B is a side-view looking at a cross-section along a length of the windrow 926. The optical sensor system in this example includes image capturing devices 922a, 922b that are arranged in a substantially side-by-side configuration so only one of the image capturing devices is visible in the side-view of FIG. 9B (the other image capturing device is behind it in a direction into the page).

The optical sensor system in this example comprises at least two image capturing devices 922a, 922b (e.g., cameras, video cameras, or the like) or optical devices that are configured to capture images. The optical sensor system may also include an illumination source to improve the images and/or to allow night-time operation. The images include at least a portion of the ground 928 and a portion of the windrow 926 within fields of view 930a, 930b. As shown in FIG. 9A, the fields of view 930a, 930b cover the width of the windrow 926 and include an overlapping portion in the middle. As shown in FIG. 9B, the fields of view 930a, 930b also capture a portion of the windrow 926 along the length of the windrow 926. These figures are intended to be illustrative of fields of view 930a, 930b of the image capturing devices 922a, 922b and the images obtained by the image capturing devices 922a, 922b. The fields of view 930a, 930b cover a segment of the windrow 926 that includes portions of the ground 928 on each side of the windrow 926.

The optical sensor system is able to stereo images of each segment of the windrow 926 and determine distances to points in the images using known stereo vision techniques. A profile of the windrow 926 can be estimated by assuming the ground 928 is substantially flat or planar. The profile of the windrow 926 is the portion of the profile that extends above the ground plane. Data smoothing techniques may be used to reduce variation due to the irregular surface of the windrow 926.

Although not shown in these figures, the optical sensor system may be coupled to a harvesting machine that moves in the direction indicated by the arrow in FIG. 9B. In some embodiments, the optical sensor system may be coupled either directly or indirectly to a bottom of the harvesting machine. The image capturing devices 922a, 922b may be arranged so that centers of their fields of view extend in a direction that is substantially normal to the windrow 926.

Using the image capturing devices 922a, 922b shown in this example, the profile of a segment of the windrow 926 can be estimated. The segment includes the area of the windrow 926 that is within the fields of view 930a, 930b of the images. Using the estimated 3D profile, an average estimated profile, a smoothed estimated profile, or the like can be used to determine a cross-sectional area of the segment (or cross-sectional areas at different points of the segment). The cross sectional areas can be used to determine a volume of the crop in each segment. The profile, cross-sectional area, and/or volume may be determined by the optical sensor system or by a controller that is separate from the optical sensor system based on signals received from the optical sensor system. Known data smoothing techniques may be used in some embodiments.

In some embodiments, a GNSS may be used to determine positions and speed of the harvesting machine associated with each segment of the windrow.

Figure 10A:
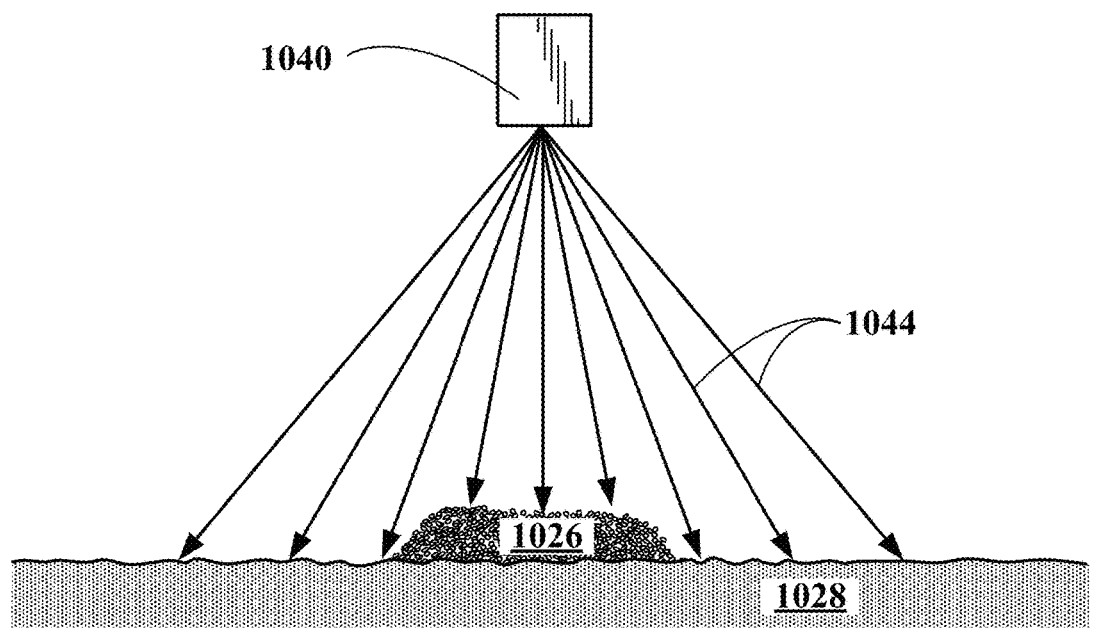
Figure 10B:
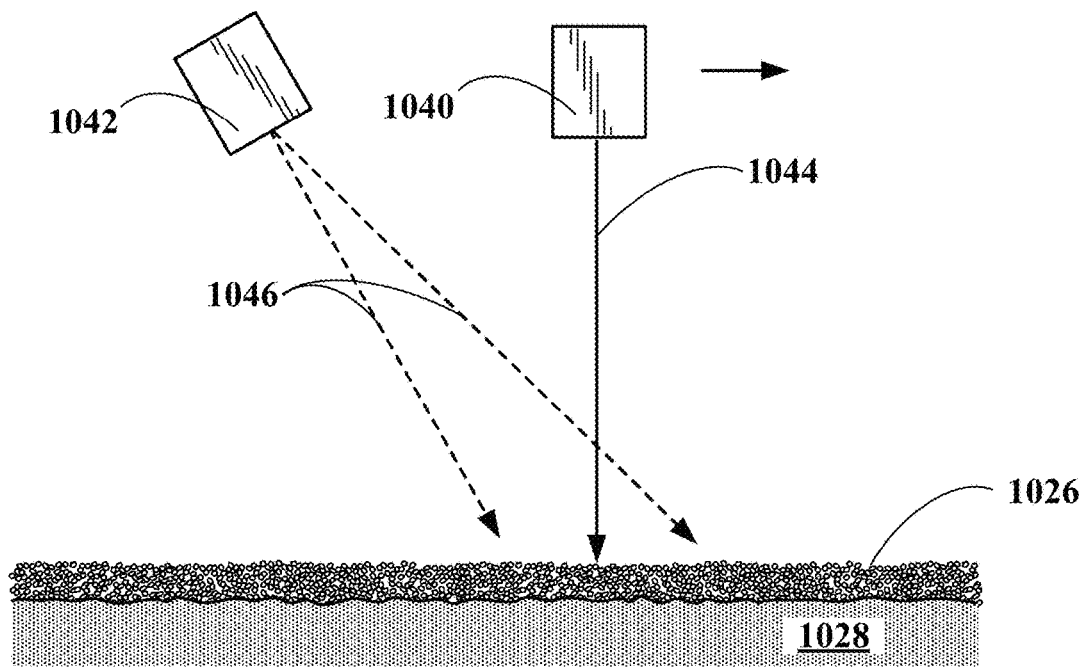
Figure 11A:
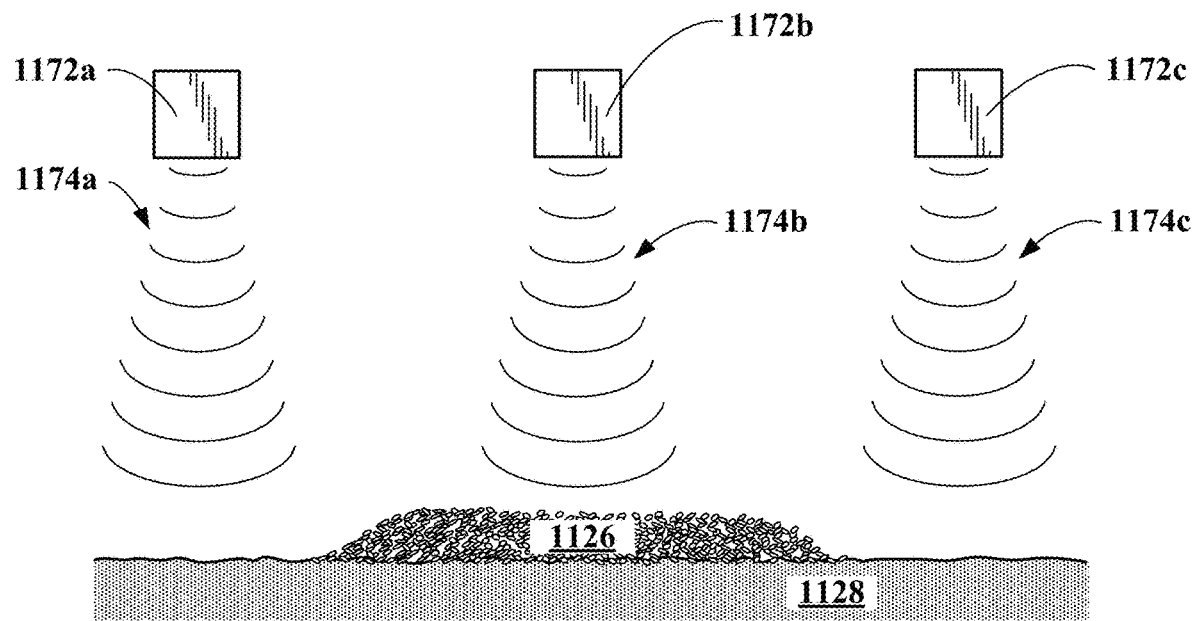
FIGS. 11A-11B are simplified drawings of an ultrasonic sensor system that can be used for determining profiles of windrows in accordance with some embodiments.
Figure 11B:
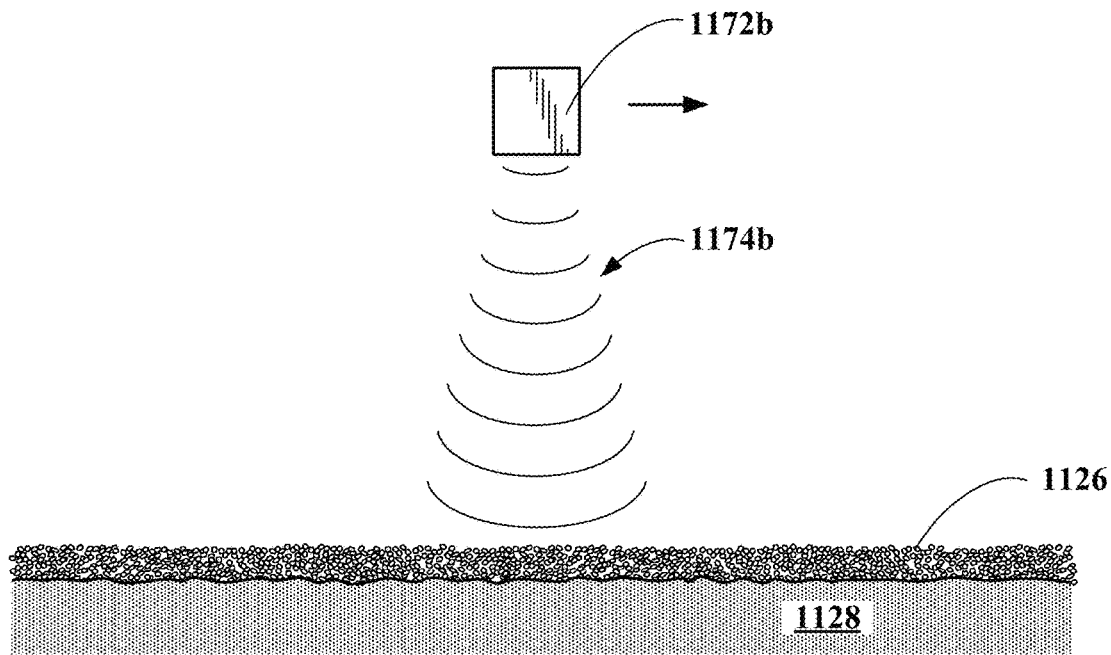

FIG. 10A-10B are simplified drawings of an optical sensor system that can be used for determining a profile of a windrow in accordance with another embodiment. FIG. 10A is a front-view looking at a cross-section across a width of a windrow 1026, and FIG. 10B is a side-view looking at a cross-section along a length of the windrow 1026. The optical sensor system includes a laser emitter 1040 and an image capturing device 1042. The image capturing device is arranged substantially behind the laser emitter 1040 so only the laser emitter 1040 is visible in the front-view of FIG. 10A (the image capturing device 1042 is behind it in a direction into the page).

The optical sensor system in this example comprises a laser emitter 1040 or laser projector that is configured to emit a laser beam and an image capturing device 1042 (e.g., camera, video camera, or the like) that is configured to capture images. As shown in FIG. 10A, the laser emitter 1040 emits a broad beam that forms a line of illhuination (or laser line) across a width of the windrow 1026 and portions of the ground 1028 on each side of the windrow 1026. As shown in FIG. 10B, the image capturing device 1042 has a field of view 1046 that encompasses the illuminated line. If the windrow 1026 were not on the ground 1028, the line of illumination would appear substantially linear in an image captured by the image capturing device 1042 (assuming the ground is substantially flat). With the windrow 1026 on the ground 1028, the line appears non-linear and the profile of the windrow 1026 can be estimated based on the degree of non-linearity using known techniques.

Although not shown in these figures, the optical sensor system may be coupled to a harvesting machine that moves in the direction indicated by the arrow in FIG. 10B. In some embodiments, the optical sensor system may be coupled either directly or indirectly to a bottom of the harvesting machine. The laser emitter 1040 may be arranged so that at least a portion of the laser beam 1044 is emitted in a direction that is substantially normal to the windrow 926.

Using the profile of the windrow 1026, a cross-sectional area of the windrow 1026 can be estimated. Profiles and cross-sectional areas of the windrow 1026 may be determined at a particular frequency and, based on a speed of the harvesting machine, a volume of a segment of the windrow 1026 can be estimated. The profile, cross-sectional area, and/or volume may be determined by the optical sensor system or by a controller that is separate from the optical sensor system based on signals received from the optical sensor system.

The segment includes a length of the windrow 1026 that is typically less than about 10 feet. The length is limited because the optical sensor system is arranged on the harvesting machine in a downward facing orientation so the windrow 1026 is within a field of view.

Using the optical sensor system in this example, the segment may be a portion of the windrow 1026 that is bound on each end by estimated profiles. Alternatively, each estimated profile may be associated with a portion of the windrow. Other methods of using the profiles to determine the volume of the windrow 1026 are anticipated, and the embodiments described herein are not limited to a particular method.

In some embodiments, a GNSS may be used to determine positions and speed of the harvesting machine associated with each segment of the windrow.

FIGS. 11A-11B are simplified drawings of an ultrasonic sensor system that can be used for determining profiles of windrows in accordance with some embodiments. FIG. 11A is a front or back-view looking at a cross-section across a width of a windrow 1126, and FIG. 11B is a side-view looking at a cross-section along a length of the windrow 1126. The ultrasonic sensor system in this example includes ultrasonic sensors 1172a, 1172b, 1172c that are arranged in a substantially side-by-side configuration so only one of the image capturing devices is visible in the side-view of FIG. 11B (one ultrasonic sensors is in front of it in a direction out of the page and the other one is behind it in a direction into the page).

The ultrasonic sensor system in this example comprises at least three ultrasonic sensors 1172a, 1172b, 1172c that are configured to use sound waves to determine distances to the ground 1128 and to the windrow 1126 using known sensing techniques. More ultrasonic sensors may be used in some embodiments. A profile of the windrow 1126 can be estimated by assuming the ground 1128 is substantially flat or planar and the windrow 1126 has a known width.

Although not shown in these figures, the ultrasonic sensor system may be coupled to a harvesting machine that moves in the direction indicated by the arrow in FIG. 11B. In some embodiments, the ultrasonic sensor system may be coupled either directly or indirectly to a bottom of the harvesting machine.

Using the profile of the windrow 1126, a cross-sectional area of the windrow 1126 can be estimated. Profiles and cross-sectional areas of the windrow 1126 may be determined at a particular frequency and, based on a speed of the harvesting machine, a volume of a segment of the windrow 1126 can be estimated. The profile, cross-sectional area, and/or volume may be determined by the ultrasonic sensor system or by a controller that is separate from the ultrasonic sensor system based on signals received from the ultrasonic sensor system.

The segment includes a length of the windrow 1126 that is typically less than about 10 feet. The length is limited because the ultrasonic sensor system is arranged on the harvesting machine in a downward facing orientation so the windrow 1126 is within a field of view.

Using the ultrasonic sensor system in this example, the segment may be a portion of the windrow 1126 that is bound on each end by estimated profiles. Alternatively, each estimated profile may be associated with a portion of the windrow. Other methods of using the profiles to determine the volume of the windrow 1126 are anticipated, and the embodiments described herein are not limited to a particular method.

In some embodiments, a GNSS may be used to determine positions and speed of the harvesting machine associated with each segment of the windrow.

Figure 12:
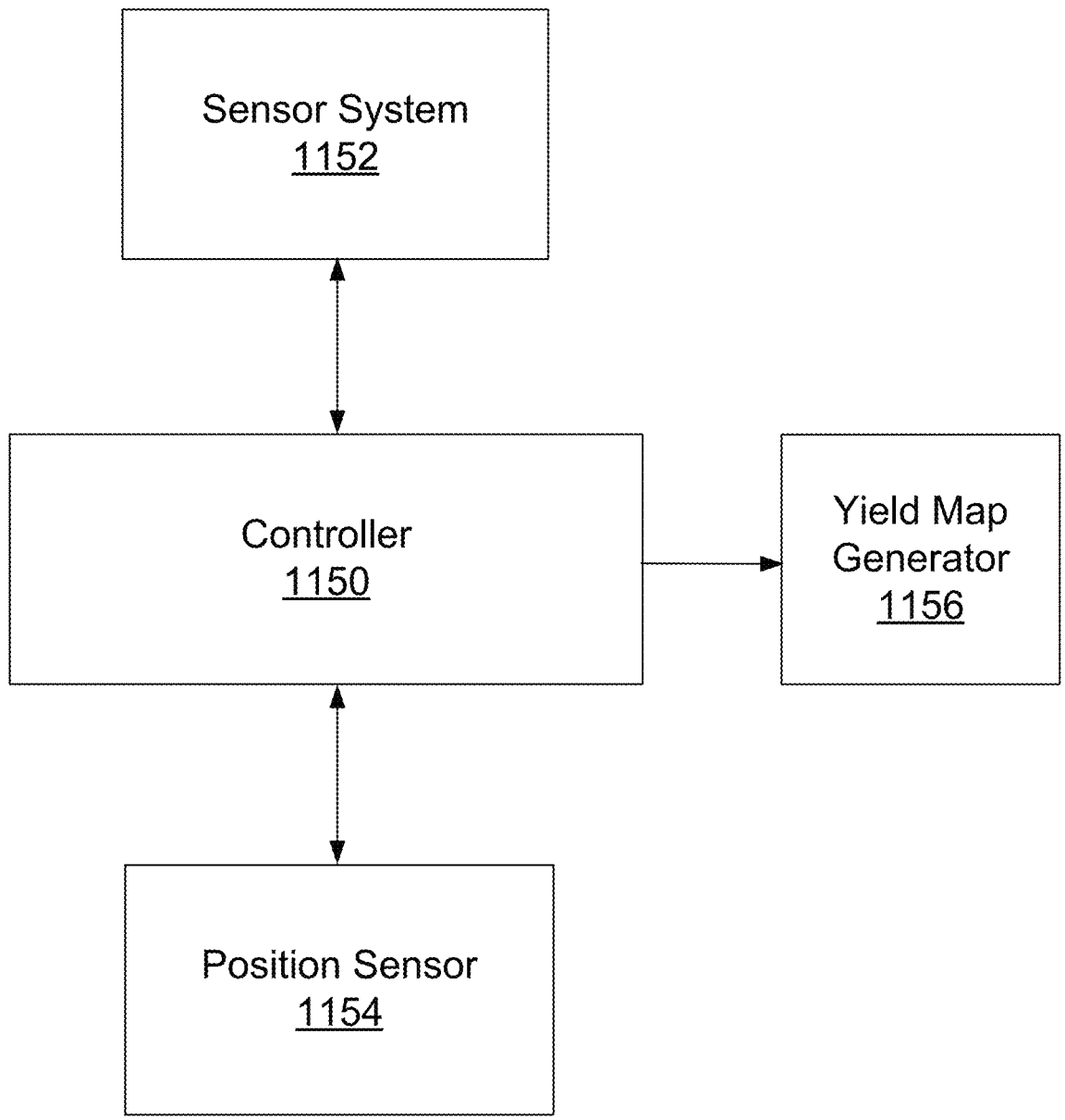
FIG. 12 is a simplified block diagram of an exemplary system for estimating yield of agricultural crops gathered in windrows in accordance with an embodiment.

FIG. 12 is a simplified block diagram of an exemplary system for estimating yield of agricultural crops gathered in windrows in accordance with an embodiment. The system includes a controller 1150, a sensor system 1152, a position sensor 1154, and a yield map generator 1156. This figure is not intended to necessarily represent separate software and/or hardware modules, but to represent different functions. These functions may be carried out by software and/or hardware modules. A least some of these modules typically include familiar software and hardware components. For example, they may include operating systems, processors, local memory for storage, I/O devices, and system buses interconnecting the hardware components. RAM and disk drives are examples of local memory for storage of data and computer programs. Other types of local memory include magnetic storage media, optical storage media, flash memory, networked storage devices, and the like.

While the modules in FIG. 12 are illustrated individually, some of them may be combined in some embodiments. For example, the controller 1150 may be part of the sensor system 1152 or the position sensor 1154. Also, the yield map generator 1156 may be part of the controller 1150. This figure is provided merely as an example of a system that may implement some of the methods described herein. Other systems implementing the embodiments described herein may include other or different modules.

In some embodiments, the sensor system 1152 includes an optical sensor system and/or an ultrasonic sensor system. The sensor system 1152 may include, for example, any of the optical sensor systems described with regards to FIGS. 4A-4B, 8A-8B, 9A-9B, 10A-10B, or the ultrasonic sensor system described with regard to FIGS. 11A-11B. Other sensor systems configured to estimate profiles of windrows may also be included. Examples include structured light sensor systems that project known patterns of light onto surfaces to determine surface information, and radar sensor systems that use radar to determine distance information. The sensor system 1152 may include at least one of an optical scanner, an image capturing device, an illumination source, a laser emitter, an ultrasonic sensor, a radar sensor, or the like that is coupled to a bottom of a harvesting machine. In some embodiments, the sensor system 1152 includes an emitter that is arranged to emit radiation or sound waves in a direction that is approximately normal to the windrow. The sensor system 1152 may be configured to receive signals indicative of profiles a windrow. Each profile may be associated with a segment of the windrow and may be used to determine a cross-sectional area of the windrow. The segments of the windrow extend across a width of the windrow and along a length of the windrow. The length may be less than about 10 feet of the windrow. The length is limited because the sensor system is arranged on the harvesting machine in a downward facing orientation in a relative close proximity to the windrow.

The position sensor 1154 may be a geographic position sensor that is configured to provide positions of the harvesting machine as it places the agricultural crop on the ground in the windrow. In some embodiments, the position sensor 1154 may include a GNSS device that is coupled to the harvesting machine. The position sensor 1154 may be used to determine positions of the harvesting machine associated with each segment of the windrow.

The controller 1150 may be communicatively coupled to the sensor system 1152 and the position sensor 1154. In some embodiments, the controller 1150 may be configured to receive the positions of the harvesting machine from the position sensor 1154, determine a speed of the harvesting machine using the geographic position sensor, receive signals from the sensor system 1152, estimate cross-sectional areas of the windrow using the signals, and estimate volumes of the windrow (and hence the agricultural crop) using the speed of the harvesting machine and the estimated cross sectional areas of the windrow. The controller 1150 may also estimate yield of the agricultural crop based on the volumes.

In some embodiments, the yield map generator 1156 includes an application running on the controller 1150 or an application running on a remote computer. The yield map generator 1156 is configured to generate a georeferenced yield map using the positions of the harvesting machine and the yield of the agricultural crop. The georeferenced yield map provides a volume of the agricultural crop in the windrow per unit area of a field or orchard.

Figure 13:
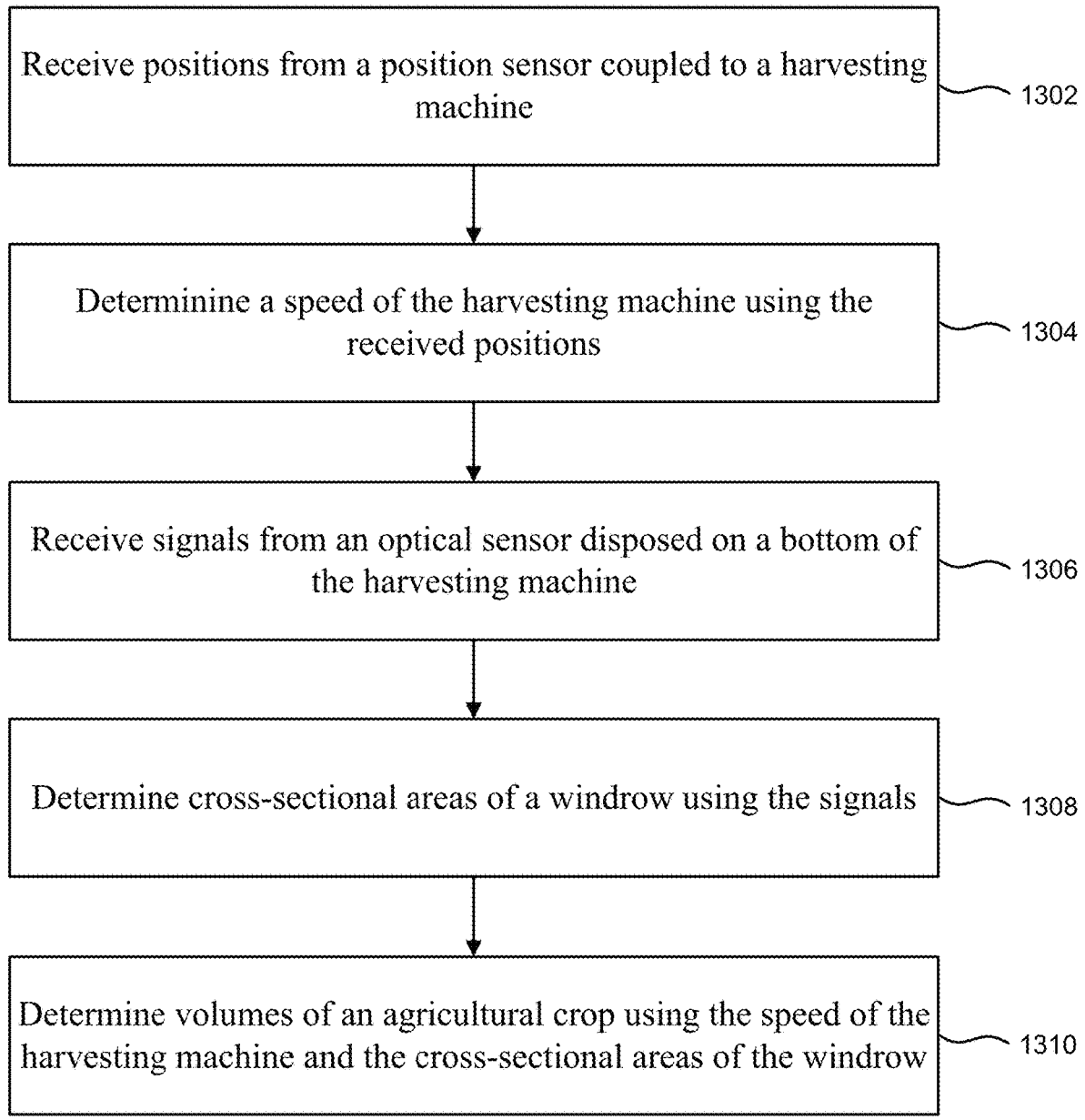
FIG. 13 is a flowchart illustrating a method for estimating yield of agricultural crops gathered in windrows in accordance with an embodiment.

FIG. 13 is a flowchart illustrating a method for estimating yield of agricultural crops gathered in windrows in accordance with an embodiment. The method includes receiving positions from a position sensor coupled to a harvesting machine (1302). The position sensor may be a geographic position sensor that is configured to provide positions and speed of the harvesting machine as it places an agricultural crop in a windrow.

A speed of the harvesting machine is determined using the position sensor (1304).

Signals from a sensor disposed on a bottom of the harvesting machine are received (1306). The sensor may be an optical sensor system or an ultrasonic sensor system, and the signals may be indicative or profiles of segments of the windrow on the ground. The profiles may be an average estimated profile, a smoothed estimated profile, or the like.

Cross-sectional areas of a windrow are determined using the signals (1308). Volumes of an agricultural crop are determined using the speed of the harvesting machine and the cross-sectional areas of the windrow (1310).

It should be appreciated that some embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other non-transitory mediums capable of storing, containing, or carrying instructions or data.

While the present invention has been described in terms of specific embodiments, it should be apparent to those skilled in the art that the scope of the present invention is not limited to the embodiments described herein. For example, features of one or more embodiments of the invention may be combined with one or more features of other embodiments without departing from the scope of the invention. The specification and drawings are, accordingly, to be regarded in an illustrative rather than a restrictive sense. Thus, the scope of the present invention should be determined not with reference to the above description, but should be determined with reference to the appended claims along with their full scope of equivalents.

What is claimed is:

1. A system for estimating volumes of an almond crop, comprising:
   an almond conditioner configured to separate almonds from detritus and to arrange the almonds on the ground in a windrow having a roughly uniform profile, the almond conditioner having an exit chute for arranging the almonds in the windrow and a stick box for collecting sticks of the detritus, the stick box located at a rear of the almond conditioner and the exit chute located forward of the stick box;
   a geographic position sensor coupled to the almond conditioner and configured to provide positions of the almond conditioner as it places the almonds in the windrow;
   a sensor system disposed on a bottom of the almond conditioner at a location between the exit chute and the stick box, wherein the sensor system is arranged so that an emitter of the sensor system is downward facing and the windrow on the ground is within a field of view of the sensor system, and the sensor system is also arranged to receive signals indicative of profiles of segments of the windrow on the ground, wherein each segment of the windrow extends across a width of the windrow and along a length of the windrow; and
   a controller configured to:
      receive the positions of the almond conditioner from the geographic position sensor;
      determine a speed of the almond conditioner using the geographic position sensor;
      receive signals from the sensor system;
      estimate cross-sectional areas of the windrow using the signals, wherein each cross-sectional area is associated with one of the segments of the windrow and represents a cross-section across the width of the windrow; and
      estimate volumes of the almonds using the speed of the almond conditioner and the estimated cross-sectional areas of the windrow.

2. The system of claim 1 wherein the length of each segment of the windrow is less than a distance between an end of the exit chute and a back end of the stick box.

3. The system of claim 1 wherein the sensor system comprises a two-dimensional (2D) optical scanner configured to scan a laser beam across the width of the windrow and to receive reflected portions of the laser beam.

4. The system of claim 1 wherein the sensor system comprises a three-dimensional (3D) time of flight (ToF) optical device configured to emit radiation toward each of the segments of the windrow and to receive reflected portions of the radiation.

5. The system of claim 1 wherein the sensor system comprises multiple optical devices configured to obtain stereo images of each segment of the windrow.

6. The system of claim 1 wherein the sensor system comprises a laser projector configured to emit a laser beam that forms an illuminated line across the width of the windrow and an optical device configured to obtain images of the illuminated line on the windrow.

7. The system of claim 1 wherein the sensor system comprises ultrasonic sensors configured to use sound waves to determine distances to the ground and to the windrow.

8. The system of claim 1 wherein the emitter is arranged to emit radiation in a direction that is approximately normal to the windrow.

9. The system of claim 1 wherein the sensor system includes at least one of an optical sensor system, an ultrasonic sensor system, or a radar sensor system.

10. A system for estimating volumes of agricultural crops gathered in windrows, comprising:
   a harvesting machine configured to gather an agricultural crop and arrange the agricultural crop on the ground in a windrow;
   a geographic position sensor coupled to the harvesting machine and configured to provide positions of the harvesting machine as it places the agricultural crop on the ground in the windrow;
   a sensor system disposed at a bottom of the harvesting machine and arranged so that an emitter of the sensor system is downward facing and the windrow on the ground is within a field of view of the sensor system, and the sensor system is also arranged to receive signals indicative of profiles of segments of the windrow on the ground, wherein each segment of the windrow extends across a width of the windrow and along a length of the windrow; and
   a controller coupled to the geographic position sensor and to the sensor system, the controller configured to:
      receive the positions of the harvesting machine from the geographic position sensor;
      determine a speed of the harvesting machine using the geographic position sensor;
      receive signals from the sensor system;
      estimate cross-sectional areas of the windrow using the signals, wherein each cross-sectional area is associated with one of the segments of the windrow and represents a cross-section across the width of the windrow; and
      estimate volumes of the agricultural crop using the speed of the harvesting machine and the estimated cross-sectional areas of the windrow.

11. The system of claim 10 wherein the length of the windrow is less than about 10 feet.

12. The system of claim 10 wherein the sensor system comprises a two-dimensional (2D) optical scanner configured to emit a laser beam and to receive reflected portions of the laser beam.

13. The system of claim 10 wherein the sensor system comprises a three-dimensional (3D) time of flight (ToF) optical device configured to emit radiation and to receive reflected portions of the radiation.

14. The system of claim 10 wherein the sensor system comprises a laser projector configured to emit a laser beam that forms a laser line on the windrow and an optical device configured to obtain images of the laser line on the windrow.

15. The system of claim 10 wherein the sensor system comprises multiple optical devices configured to obtain images of the segments of the windrow.

16. The system of claim 10 the sensor system includes at least one of an optical sensor system, an ultrasonic sensor system, or a radar sensor system.

17. The system of claim 10 wherein the emitter is arranged to emit radiation in a direction that is approximately normal to the windrow.

18. A method for estimating volumes of agricultural crops gathered in windrows, the method comprising:
   receiving positions from a geographic position sensor coupled to a harvesting machine, the positions received as the harvesting machine gathers an agricultural crop and places the agricultural crop on the ground in a windrow;
   determining a speed of the harvesting machine using the geographic position sensor;
   receiving signals from a sensor system disposed at a bottom of the harvesting machine and arranged so that an emitter of the sensor system is downward facing and the windrow on the ground is within a field of view of the sensor system, wherein the signals are indicative of profiles of segments of the windrow on the ground, and wherein each segment of the windrow extends across a width of the windrow and along a length of the windrow;
   estimating cross-sectional areas of the windrow using the signals, wherein each cross-sectional area is associated with one of the segments of the windrow and represents a cross-section across the width of the windrow; and
   estimating volumes of the agricultural crop using the speed of the harvesting machine and the estimated cross-sectional areas of the windrow.

19. The method of claim 18 wherein the length of the windrow is less than about 10 feet.

20. The method of claim 18 further comprising:
   estimating a yield of the agricultural crop based on the volumes; and
   generating a yield map using the positions of the harvesting machine and the yield of the agricultural crop.

21. The method of claim 18 wherein the signals are generated using at least one of an optical sensor system that emits radiation toward each of the segments of the windrow and receives reflected portions of the radiation, or an ultrasonic sensor system that emits sound waves toward each segment of the windrow and receives reflected portions of the sound waves.

22. The method of claim 18 wherein the signals are generated using at least one of an optical sensor system, an ultrasonic sensor system, or a radar sensor system.

* * * * *